United States Patent
Erben et al.

(10) Patent No.: US 8,757,549 B2
(45) Date of Patent: Jun. 24, 2014

(54) FUEL GAUGE FOR AN UNMANNED AERIAL VEHICLE

(75) Inventors: Erik Erben, Rio Rancho, NM (US); Michael W. Moore, Albuquerque, NM (US); Justin J. Ebaugh, Rio Rancho, NM (US)

(73) Assignee: Honeywell International Inc., Morristown, NJ (US)

( * ) Notice: Subject to any disclaimer, the term of this patent is extended or adjusted under 35 U.S.C. 154(b) by 1065 days.

(21) Appl. No.: 12/769,248

(22) Filed: Apr. 28, 2010

(65) Prior Publication Data
US 2011/0266394 A1 Nov. 3, 2011

(51) Int. Cl.
*B64D 37/00* (2006.01)

(52) U.S. Cl.
USPC ............. 244/135 B; 244/135 R; 73/290 R; 73/291; 222/92; 222/206

(58) Field of Classification Search
USPC ....... 244/135 B, 135 R; 73/290, 291; 222/92, 222/206
See application file for complete search history.

(56) References Cited

U.S. PATENT DOCUMENTS

| | | | |
|---|---|---|---|
| 4,804,944 A * | 2/1989 | Golladay et al. | 340/624 |
| 6,260,544 B1 * | 7/2001 | Spry et al. | 123/516 |
| 6,571,626 B1 | 6/2003 | Herford | |
| 6,990,860 B1 * | 1/2006 | Gillanders | 73/149 |
| 7,600,423 B1 * | 10/2009 | Fluhler et al. | 73/290 B |
| 2004/0200278 A1 | 10/2004 | Gansebom | |
| 2005/0000980 A1 | 1/2005 | Goepfert | |
| 2005/0268715 A1 * | 12/2005 | Sabatino | 73/313 |
| 2007/0056985 A9 | 3/2007 | Goepfert | |
| 2008/0179333 A1 | 7/2008 | Fuller et al. | |
| 2010/0005903 A1 | 1/2010 | Beavis | |
| 2010/0127131 A1 * | 5/2010 | Fenton | 244/23 A |

* cited by examiner

*Primary Examiner* — J. Woodrow Eldred
(74) *Attorney, Agent, or Firm* — Shumaker & Sieffert, P.A.

(57) ABSTRACT

An amount of fuel in a fuel bladder of an unmanned aerial vehicle (UAV) is determined based on a deformation of the bladder. In some examples, a fuel system for a UAV includes a bladder, a proximity sensor, a fuel gauge, and a controller. The bladder is deformable based on the amount of fuel in the bladder. The proximity sensor may output a signal that varies as a function of the deformation of the bladder. The controller may determine the amount of fuel in the bladder based on the signal output by the proximity sensor and control the fuel gauge to indicate the determined amount of fuel.

18 Claims, 5 Drawing Sheets

FUEL GAUGE FOR AN UNMANNED AERIAL VEHICLE

TECHNICAL FIELD

The disclosure relates to fuel systems employed in various types of aircraft including unmanned aerial vehicles.

BACKGROUND

An unmanned aerial vehicle (UAV) is an aircraft that flies without a human crew on board the aircraft. A UAV can be used for various purposes, such as the collection of ambient gaseous particles, observation, thermal imaging, and the like. A micro air vehicle (MAV) is one type of UAV, which, due to its relatively small size, can be useful for operating in complex topologies, such as mountainous terrain, urban areas, and confined spaces. The structural and control components of a MAV are constructed to be relatively lightweight and compact.

SUMMARY

In general, this disclosure is directed to devices, systems, and techniques for determining an amount of fuel (e.g., a volume) in a fuel bladder of an unmanned aerial vehicle (UAV) based on the deformation of the fuel bladder. In some examples described herein, a proximity sensor outputs a signal that varies as a function of the deformation of the fuel bladder, and a controller determines the amount of fuel in the fuel bladder based on the signal.

In one example, a fuel system for a UAV includes a deformable bladder, a proximity sensor, a fuel gauge, and a controller. The deformable bladder is configured to store fuel. The proximity sensor is configured to output a signal based on deformation of the bladder. The controller is configured to determine an amount of the fuel in the bladder based on the signal output by the proximity sensor and control the fuel gauge to indicate the amount of fuel.

In another example, a UAV includes a fan duct, a bladder, a proximity sensor, a fuel gauge, and a controller. The fan duct defines a chamber. The bladder is arranged within the chamber and deforms based on an amount of fuel in the bladder. The proximity sensor is configured to output a signal indicative of a deformation of the bladder. The controller is configured to determine an amount of fuel in the bladder based on the signal output by the proximity sensor and control the fuel gauge to indicate the determined amount of fuel.

In another example, a method includes determining a deformation of a bladder of an unmanned aerial vehicle with a proximity sensor, determining an amount of fuel in the bladder based on the deformation, and indicating, via a fuel gauge, the amount of fuel in the bladder.

In another aspect, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, random access memory or RAM) or any other type of volatile or non-volatile memory that stores instructions (e.g., in the form of a computer program or other executable) to cause a programmable processor to perform the techniques described herein.

The details of one or more examples are set forth in the accompanying drawings and the description below. Other features, objects, and advantages of the disclosed examples will be apparent from the description and drawings, and from the claims.

DETAILED DESCRIPTION

Figure 1:
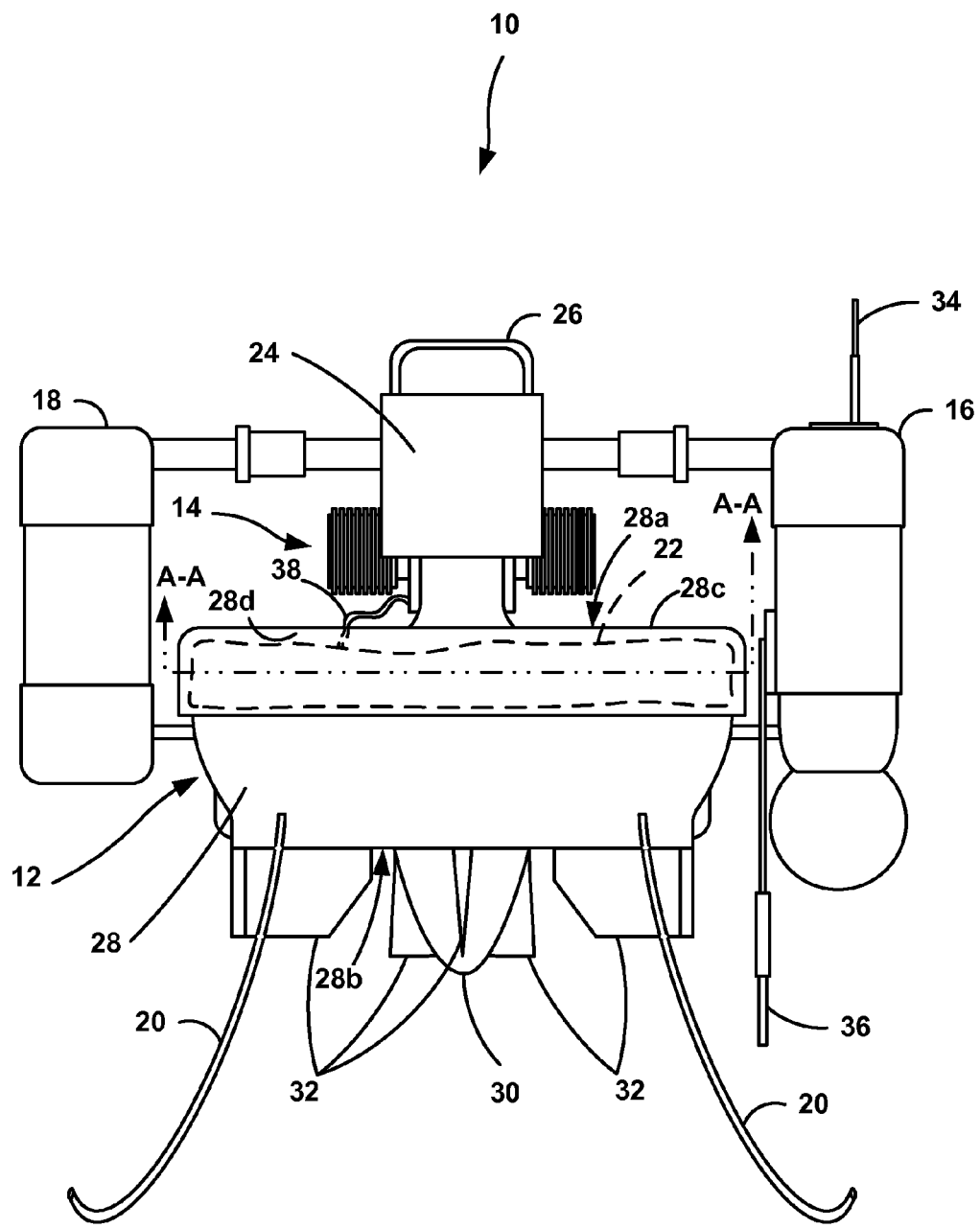
FIG. 1 is an elevation view of an example MAV.

While MAVs are primarily referred to herein, the devices, systems, and techniques for determining an amount of fuel (e.g., a volume or an approximate percentage of fullness or emptiness) in a fuel bladder are applicable to any suitable UAV. It can be useful for the operator of the MAV to know the amount of fuel in the MAV, e.g., to control the flight time of the MAV. If the amount of fuel in the MAV is unknown or misrepresented, the MAV may run out of fuel unexpectedly, which can result in a collision with the terrain or structure if the MAV is in flight. A collision with terrain or a structure has the potential to disable or damage the MAV to the extent that it may not be able to further perform its intended function, which may lead not only to the loss of some or all of the MAV but also inconvenience personnel supported by the vehicle. Fuel depletion can be one cause of MAV crashes or other collisions. Although the amount of fuel carried by an MAV into a mission may be estimated and tracked in current designs, errors in or limitations of current MAV fuel systems may lead to inadvertently extending the mission beyond the range allowed by the actual amount of fuel the vehicle is carrying.

Some MAVs include a fuel bladder that stores the fuel for the operation of the MAV. The fuel bladder may be enclosed in an opaque chamber, out of sight of an operator, such that determining the amount of fuel (e.g., the fuel level) of the MAV fuel bladder can be relatively difficult to visually ascertain. In some cases, an operator that manually fills the fuel bladder can determine the amount of fuel in the bladder based on the amount of fuel the operator manually introduces into the bladder. For example, during a fueling session, an operator may manually fuel the MAV by filling the fuel bladder with a syringe. The operator determines the approximate volume of fuel delivered to the bladder by, e.g., counting the number of full syringes delivered to the aircraft. In another example, during a fueling session, the operator may use an electric fueler to fuel the MAV, where the electric fueler delivers a metered volume to the bladder.

If the fuel bladder was empty prior to introduction of the fuel by the operator or if the operator knows the approximate amount of fuel in the bladder prior to introduction of the fuel, the operator can estimate the amount of fuel in the fuel bladder following the fueling session based on the volume of fuel introduced into the fuel bladder during the fueling session. However, in both the syringe and electric fueler examples, the amount of fuel in the bladder may be unknown or misrepresented if the pilot is not the person fueling or if there are distractions during fueling. Additionally, the longer the time between fueling and flight, the greater the possibility that the amount of fuel may be misrepresented.

In another example, the operator may defuel the MAV and weigh the vehicle before and after fueling. The operator may then determine the amount of fuel delivered to the MAV with a standard reference that correlates weights to fuel volumes. The MAV may also be weighed just prior to flight to verify the amount of fuel in the bladder. This method requires additional support equipment (i.e., a scale) that requires calibration. Additionally, none of the foregoing systems actively monitor the amount fuel in the MAV bladder. As such, there may be some possibility that the amount of fuel in the bladder at any given time is unknown or incorrect in the foregoing systems and methods.

In other examples, a MAV or operator can estimate the amount of fuel in the fuel bladder of the MAV based on a timer. However, MAV may consume different amounts of fuel during flight based on the altitude at which the MAV flies. Thus, the timer technique for tracking the amount of fuel in the fuel bladder of the MAV may misrepresent the actual amount of fuel in the fuel bladder.

A fuel system for a UAV, such as a MAV, that automatically determines the amount of fuel in a fuel bladder based on a deformation of the fuel bladder is described with respect to FIGS. 1-5. In some examples, a fuel system for an MAV includes a fuel bladder (also referred to as a "bladder"), at least one proximity sensor, a fuel gauge, and a controller. The fuel bladder is deformable based on the amount of fuel in the bladder. The proximity sensor outputs a signal based on deformation of the bladder. For example, the proximity sensor outputs a signal that varies as a function of the proximity of the bladder to a substantially fixed portion of the UAV (e.g., a wall of a fan duct), whereby as the bladder deforms based on the amount of fuel in the bladder, the proximity between the bladder and the substantially fixed portion of the UAV changes. The controller determines the amount of fuel in the bladder based on the signal output by the proximity sensor and controls the fuel gauge to indicate the determined amount of fuel.

The example UAV fuel systems described herein that automatically determine the amount of fuel in a fuel bladder based on a deformation of the fuel bladder may result in a more reliable UAV. For example, an indication of an amount of fuel that is automatically determined by a fuel system in accordance with techniques disclosed herein can help an operator plan a flight mission for a UAV or adjust a current flight mission based on the amount of fuel remaining. The flight mission can be planned or adjusted to, for example, have a duration that avoids depleting the fuel bladder of fuel. In addition, it can be desirable for the fuel bladder of a MAV to include only the amount of fuel required to support the current flight mission in order to, for example, minimize the weight of the MAV. Thus, automatically determining the amount of fuel in the fuel bladder of the MAV can be useful for improving the performance of the MAV by minimizing the fuel onboard the MAV, thereby minimizing the weight of the MAV.

FIG. 1 is an elevation view of an example MAV 10 including ducted fan 12, engine 14, pods 16 and 18, landing gear 20, and fuel bladder 22. In FIG. 1, engine 14 is located toward the inlet end of ducted fan 12 and mechanically connected (either directly or indirectly) to the ducted fan. Pods 16 and 18 are offset laterally and connected to central console 24 that includes engine 14 and handle 26. In the example shown in FIG. 1, four landing gears 20 (only two are shown in the view of FIG. 1) are connected to ducted fan 12.

Engine 14 is operatively connected to and configured to drive ducted fan 12. In the example shown in FIG. 1, engine 14 is a reciprocating engine, and, in particular, a two cylinder internal combustion engine. However, other example MAVs may include other types of engines including, e.g., a gas turbine engine or electric motor. Engine 14 may be operatively connected to ducted fan 12 via an energy transfer apparatus, such as, but not limited to, a differential.

Ducted fan 12 includes bladder 22, duct 28, a rotor fan (not shown in FIG. 1), and tail cone 30. In some examples, ducted fan 12 will include both a rotor fan and stator fan. In such examples, the rotor fan, stator fan, and tail cone 30 may be arranged axially in the direction of flow through ducted fan 12 from duct inlet 28a to duct outlet 28b. In operation, the rotor fan of ducted fan 12 rotates to draw a working medium gas including, e.g., air, into duct inlet 28a. The working medium gas is drawn through the rotor fan, directed by the stator fan and accelerated out of duct outlet 28b around tail cone 30. The acceleration of the working medium gas through duct 28 generates thrust to propel MAV 10 and control vanes 32 may be manipulated to direct the MAV along a particular trajectory, i.e., a flight path. In this manner, engine 14 drives ducted fan 12 to propel MAV 10 in flight. Duct 28 of ducted fan 12 may be formed of any suitable material including, e.g., various composites, aluminum or other metals, a semi rigid foam, various elastomers or polymers, aeroelastic materials, or even wood.

Although MAV 10 depicted in FIG. 1 includes one ducted fan 12, the number of ducted fans may vary in other example vehicles. In one example, an MAV may include two or more ducted fans 12. Various other features may also vary in other embodiments. In examples including an even number of ducted fans 12, each of the fans may be aligned side-by-side along a lateral plane (e.g., extending in a plane perpendicular to the plane of the image shown in FIG. 1).

Pods 16 and 18 of MAV 10 may include, e.g., avionics and payload pods. In one example, pod 16 may be configured to carry an avionics package including, e.g., avionics for communicating to and from MAV 10, navigating the MAV, as well as flight control electronics and sensors. In the example of FIG. 1, pod 16 also includes communications antennae 34, 36, which may be configured for radio and video communications, respectively, to and from MAV 10. Additionally, pod 18 may be configured to transport various types of payloads for any number of missions for MAV 10, including, e.g., objects to be dropped or placed by the MAV. In some examples, pods 16, 18 can also be switched, such that pod 16 includes a payload and pod 18 includes avionics.

Landing gear 20 of MAV 10 are formed as elongated rods with curved feet configured to engage a landing surface and may be fabricated from a variety of materials including metals, plastics, and composites. In some examples, landing gear 20 may be fabricated from one or more materials that exhibit some inherent resiliency to cushioning the MAV during landings. Other example MAVs may include fewer or more landing gear 20, which may be connected to different components of the vehicle than shown in the example of FIG. 1.

In the example of FIG. 1, MAV 10 may also include one or more sensors and handle 26. In some examples, sensors may be attached, e.g., to avionics pod 16, and configured to sense objects and/or other conditions surrounding MAV 10 and to facilitate operation thereof. For example, MAV 10 may include sensors that sense the attitude and air speed of the vehicle, as well as ambient air pressure and temperature. MAV 10 may have sensors disposed in other positions relative to the components of the vehicle. For example, pressure sensors may be mechanically connected to and distributed around a lip of duct 28 of ducted fan 12 (e.g., evenly or unevenly space around the lip of duct 28).

Handle 26 is attached to, coupled to, or formed integral with central console 24 that includes engine 14. Handle 26 may generally be used to move MAV 10 off of a starter after engine 14 of the aircraft is running. Handle 26 may also be configured to assist with capture of MAV 10, for example, by being engaged by a non-depicted capture device. In the example depicted in FIG. 1, handle 26 protrudes out from central console 24. However, in other examples, handle 26 may be implemented as a pocket or other recess in central console 24. In addition, in some examples, MAV 10 does not include handle 26.

As mentioned above, ducted fan 12 includes fuel bladder 22. In particular, in the example of FIG. 1, fuel bladder 22 is disposed within a chamber of duct 28 toward inlet 28a of the duct. In particular, duct 28 includes annular inlet section 28c, which constitutes an outer housing including a number of walls that define chamber 28d. Chamber 28d is defined internal to duct 28 such that the inner compartment of chamber 28d is substantially obscured from view by the outer housing of duct 28. Bladder 22 is disposed within and supported by chamber 28d of inlet section 28c of duct 28. Engine 14 is powered by fuel stored in fuel bladder 22, which is drawn from the bladder by the engine via fuel line 38.

Fuel bladder 22 is deformable, such that the amount of fuel in the bladder affects the shape and/or size of fuel bladder 22. In this way, the deformation of fuel bladder 22 can indicate the amount of fuel contained within fuel bladder 22. In the example shown in FIG. 1, fuel bladder 22 is fabricated from a malleable (e.g., substantially flexible or non-self-supporting) material that deforms, and, in particular, expands and collapses based on the amount of fuel in the bladder. For example, bladder 22 may be fabricated from polyurethane or any other plastic appropriate for holding fuel. In other examples, however, MAV 10 may include a fuel bladder with a bellows that is configured to expand and collapse based on the amount of fuel in the bladder. In another example, MAV 10 may include a bladder fabricated from a resilient material that is configured to stretch and contract based on the amount of fuel in the bladder.

Figure 2:
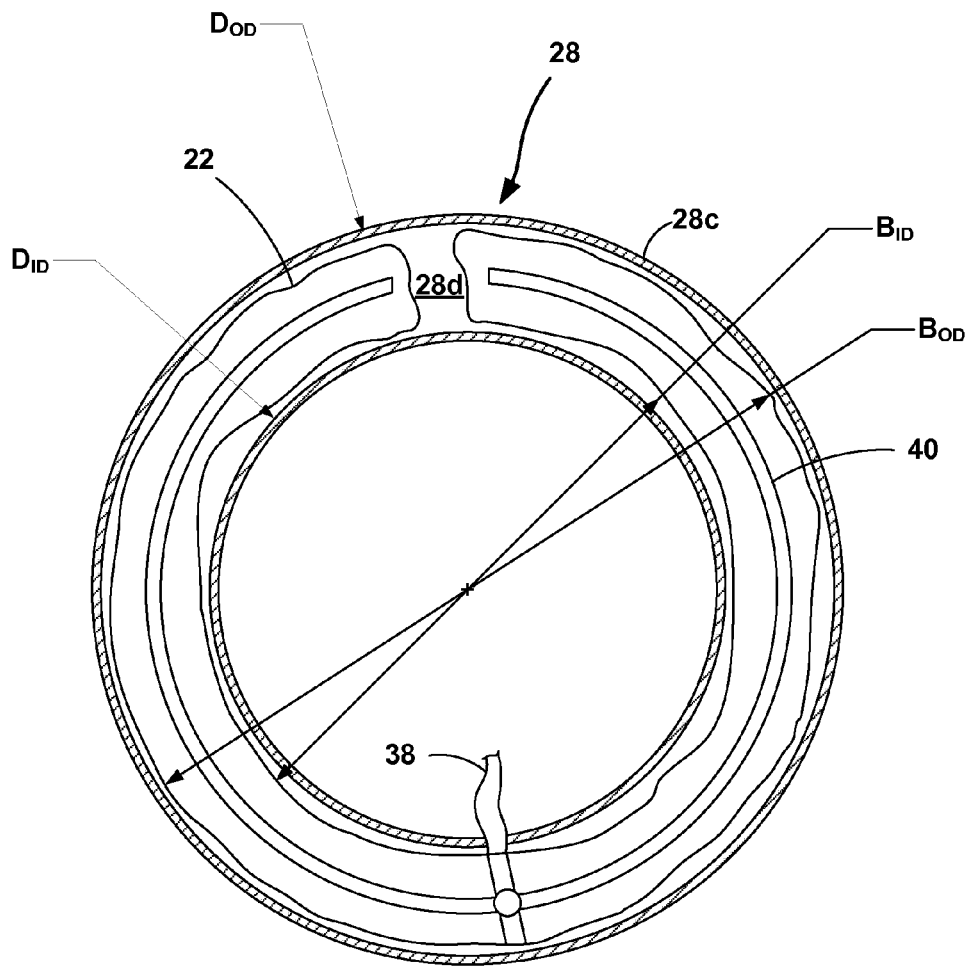
FIG. 2 is a schematic partial section view of the fan duct of the MAV of FIG. 1 cut along section line A-A in FIG. 1.

FIG. 2 is a partial schematic section view of annular inlet section 28c of duct 28 of ducted fan 12 cut along section line A-A in FIG. 1. For clarity, the other components of MAV 10 and ducted fan 12 have been removed in FIG. 2. In FIG. 2, bladder 22 is arranged in chamber 28d of duct inlet section 28c such that bladder 22 forms a substantially "C" shape extending around a majority of the circumference of the inlet section 28c (e.g., the inner perimeter of duct 28). Fuel line 38 is fluidically connected to an inner compartment of bladder 22 in which the fuel is stored. Fuel line 38 passes through an aperture in inlet section 28c of duct 28 in order to access fuel bladder 22. Fuel line 38 may be configured to draw fuel from and supply fuel to bladder 22. In the example of FIG. 2, fuel line 38 includes conduit 40 spanning substantially all of the length of bladder 22. Conduit 40 may include a number of ports fluidically connected to the inner chamber of bladder 22 such that fuel drawn from bladder 22 via fuel line 38 is drawn from a number of locations along the length of bladder 22, which is generally corresponds to a partial circumference measured from one end of the "C" shaped bladder to the other. Employing conduit 40 with a number of ports connected to bladder 22 may facilitate uniform deformation, e.g. expansion and collapse of the bladder as fuel is added to or removed from the bladder via fuel line 38.

Although the example of FIG. 2 includes one fuel line 38 for adding fuel to and removing fuel from bladder 22, other examples may include one or more fuel lines fluidically connected to bladder 22. Additionally, instead of employing fuel line 38 with conduit 40 as shown in FIG. 2, other examples may employ a number of fuel lines distributed along the length of bladder 22 and configured to simultaneously add fuel to or remove fuel from the bladder, or a single fuel line with a single conduit that is fluidically coupled to a single port that is in fluid communication with the inner compartment of fuel bladder 22.

As fuel is drawn from bladder 22 via fuel line 38 to power engine 14 to drive ducted fan 12 to propel MAV 10 in flight, the bladder collapses within chamber 28d of inlet section 28c of duct 28 shown in FIG. 2. Similarly, as MAV 10 is refueled by adding fuel to bladder 22 via fuel line 38 (or other means), the bladder expands within chamber 28d of inlet section 28c. In one example, bladder 22 may collapse and expand such that the outer diameter, $B_{OD}$, of the bladder collapses towards the inner diameter, $D_{ID}$, inlet section 28c of duct 28. In another example, bladder 22 may collapse and expand such that the inner diameter, $B_{ID}$, of the bladder collapses towards the outer diameter, $D_{OD}$, of inlet section 28c. Bladder 22 may not define an exact circular shape. Thus, inner diameter $B_{ID}$ and outer diameter $B_{OD}$ may refer to an inner perimeter and an outer perimeter, respectively, of bladder 22 in some examples.

In another example, bladder 22 may collapse and expand such that the outer diameter, $B_{OD}$, and the inner diameter, $B_{ID}$, of the bladder collapse toward the middle of chamber 28d of inlet section 28c within which the bladder is arranged. In some examples bladder 22 may be placed within chamber 28d of inlet section 28c of duct 28 without being separately secured to chamber 28d, while, in other examples the bladder may be adhered to or otherwise mechanically affixed to the walls of the chamber. For example, a portion of the exterior surface of bladder 22 may be adhered to the walls of chamber 28d by, e.g., an adhesive, epoxy, or another fixation mechanism.

Bladder 22 is configured to deform, e.g. expand and collapse within chamber 28d of inlet section 28c of duct 28 based on the amount of fuel in the bladder. As described in greater detail with reference to FIGS. 3-5, MAV 10 may employ at least one proximity sensor that generates a signal based on the deformation of bladder 22, which may be used to determine the amount of fuel in the bladder and display the fuel level with a fuel gauge.

Figure 3:
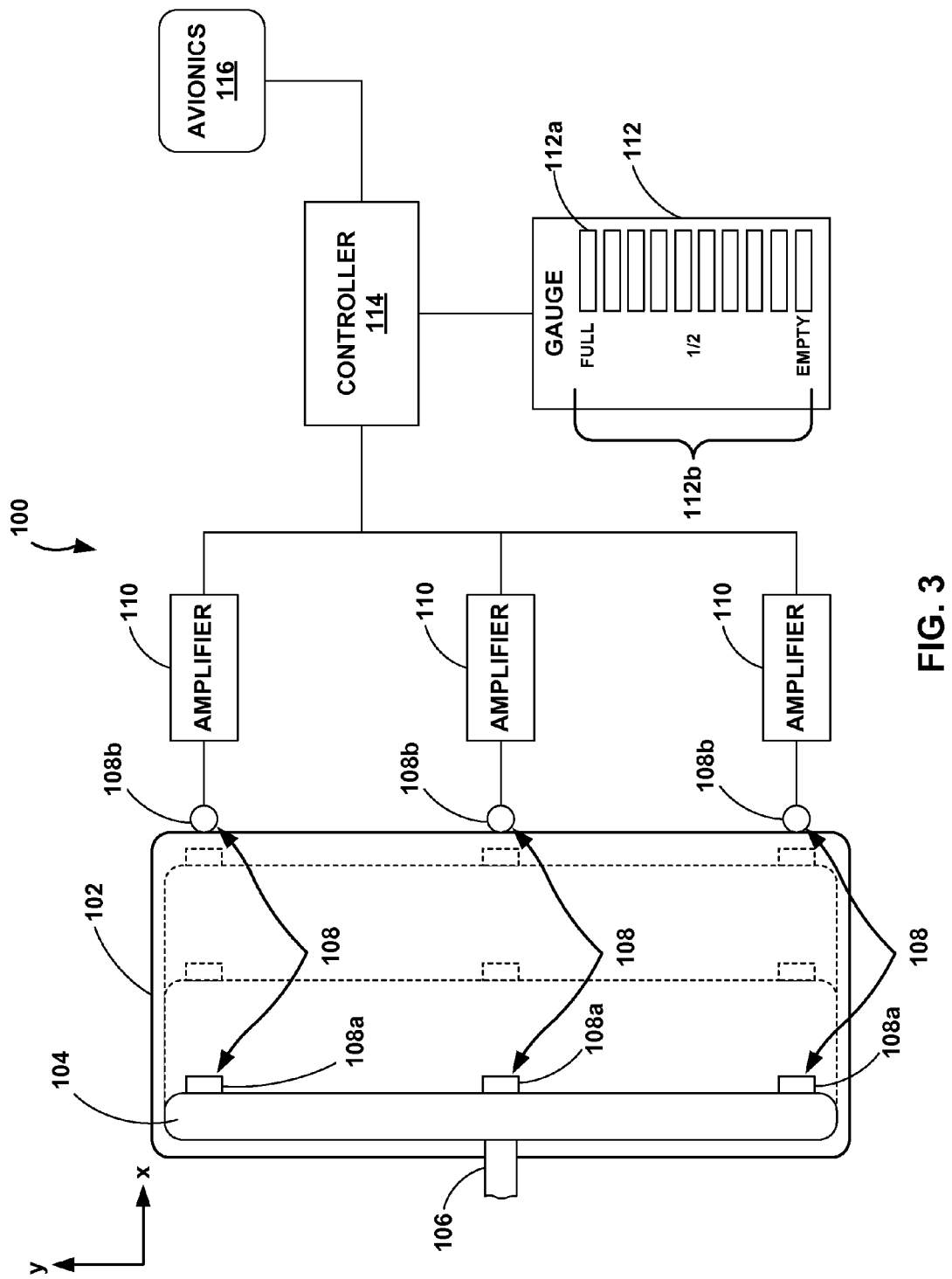
FIG. 3 is a schematic illustration of an example fuel system employed in a MAV to determine and display the amount of fuel in a fuel bladder of the vehicle.

FIGS. 3 and 4A-4C are schematic illustrations of an example fuel system 100 that may be employed in an MAV, including, e.g., MAV 10 of FIGS. 1 and 2. FIG. 3 is a schematic illustration of fuel system 100 including bladder chamber 102, bladder 104, fuel line 106, proximity sensors, e.g. Hall effect sensors 108 in the example shown in FIG. 3, sensor amplifiers 110, fuel gauge 112, controller 114, and avionics 116. In FIG. 3, bladder 104 is arranged within bladder chamber 102. As with bladder 22 of FIGS. 1 and 2, bladder 104 may be placed within bladder chamber 102 or adhered to the walls of the bladder chamber by, e.g., an adhesive, epoxy, or another fixation mechanism. Although bladder chamber 102 and bladder 104 are schematically represented in a generally rectangular configuration in the example of FIG. 3, other examples include other configurations including the annular bladder chamber of duct 28 and "C" shaped bladder 22 of the example of FIGS. 1 and 2. Thus, in some examples, bladder 104 can be similar to bladder 22 and bladder chamber 102 can be similar to chamber 28d of inlet section 28c of duct 28 of MAV 10 shown in FIGS. 1 and 2.

Fuel line 106 is fluidically connected to bladder 104 passing through an aperture in bladder chamber 102, which can be any suitable chamber defined by a member of a UAV, such as a fan duct. Fuel line 106 is configured to draw fuel from and/or add fuel to bladder 104. Fuel line 106 can be, for example, similar to fuel line 38 of MAV 10 shown in FIGS. 1 and 2. Each Hall effect sensor 108 includes a magnet 108a and sensor 108b that is substantially aligned with the respective magnet 108a along the x-axis, and, in some examples, along the y-axis and/or the z-axis (orthogonal x-y axes are shown in FIG. 3 for ease of description of FIG. 3 only).

Magnets 108a are mechanically connected to bladder 104. In one example, magnets 108a are adhered to an outer surface of bladder 104, including, e.g., by an adhesive or an epoxy. In another example, bladder 104 includes pockets (e.g., along an exterior surface and/or an interior surface) in which magnets 108a may be placed and retained. Other techniques for mechanically securing magnets 108a to bladder 104 are contemplated. In the example shown in FIG. 3, walls of bladder chamber 102 (e.g., as defined by duct 28) that support bladder 104 are not metallic, such that bladder chamber 102 does not interfere with the operation of sensors 108. In other examples, such as examples in which fuel system 100 includes proximity sensors that do not rely on magnets, walls of bladder chamber 102 (e.g., as defined by duct 28) that support bladder 104 can be formed from any suitable material, including metallic materials.

Sensors 108b are arranged outside of bladder chamber 102 (e.g., along an exterior surface of duct 28 or physically separate from duct 28 and, in some examples, MAV 10) and are generally aligned with respective ones of magnets 108a. In another example, however, sensors 108b may be arranged within bladder chamber 102 and connected to amplifiers 110, e.g., through an aperture in the chamber. The example of FIG. 3 employs one amplifier 110 for each Hall effect sensor 108 to boost the strength of signals generated by the sensors 108. Sensor amplifiers 110 are interposed between Hall effect sensors 108 and controller 114. In other examples, fuel system 100 may include more or fewer amplifiers. In one example, fuel system 100 may include one amplifier configured to be selectively connected to all three sensors 108b through a switch. Controller 114 is connected to both fuel gauge 112 and avionics 116.

During operation of an MAV including fuel system 100 shown in FIG. 3, fuel will, at various times, be added to and removed from bladder 104, e.g. via fuel line 106. As the amount of fuel in bladder 104 changes, the bladder will deform, e.g. expand and collapse within bladder chamber 102. Bladder 104 is illustrated in FIG. 3 in solid lines in an at least partially collapsed state and in dashed lines in two more expanded states. Hall effect sensors 108 are configured to generate a signal indicative of the deformation of bladder 104 as the amount of fuel in the bladder changes. In one example, sensors 108b of Hall effect sensors 108 are each configured to output a voltage to the respective amplifier 110 that is based on the distance between the sensor and respective magnet(s) 108a. As such, the voltage output by sensors 108b changes based on the expansion and collapse of bladder 104, because such deformation of the bladder changes the distance between the sensors and magnets 108a. Instead of or in addition to outputting voltage, Hall effect sensors 108 may, in some examples, be configured to output current or pulse width modulated (PWM) signals as a function of the distance between each respective sensor 108b and magnet 108a. For example, in some examples, the current output by sensors 108b may change based on the expansion and collapse of bladder 104, because such deformation of the bladder changes the distance between the sensors and magnets 108a. As another example, in some examples, the pulse width of a signal output by sensors 108b may change based on the expansion and collapse of bladder 104, because such deformation of the bladder changes the distance between the sensors and magnets 108a.

In some examples, Hall effect sensors 108, and, in particular, magnets 108a may be spaced from one another based on the strength of the magnets to minimize or even eliminate coupling of each magnet of each Hall effect sensor 108 with one or more adjacent sensors 108b of other Hall effect sensors 108. For example, in FIG. 3, magnetic coupling may occur between the uppermost magnet 108a (e.g., closest to the time of the image) in the view of FIG. 3 and the middle sensor 108b. The strength of magnets 108a may be selected based on the maximum distance that each of the respective Hall effect sensors 108 would need to detect, which may depend, e.g., on a maximum deformation of bladder 104 when the bladder is full or near full of fuel to when the bladder is empty or near empty. As the strength of each of the magnets 108a increases, the distance between magnets 108a and adjacent sensors 108b (e.g., a sensor 108b other than the sensor directly opposing the respective magnet 108a) may be increased to minimize or even avoid magnetic coupling between one magnet 108a and a sensor 108b of an adjacent Hall effect sensor 108.

In some examples, some magnetic coupling issues may be minimized by alternating the poles of magnets 108a and calibrating sensors 108b after installation such that each magnet 108a has a different pole than any other immediately adjacent magnets 108a. In this manner, each of magnets 108a may be configured to interact with the one of sensors 108b included in the same Hall effect sensor 108, but not couple with other adjacent sensors 108a of other Hall effect sensors 108.

In one example, fuel is added to bladder 104 such that the bladder expands from the collapsed state represented in FIG. 3 in solid lines to one of the two more expanded states represented in dashed lines. As bladder 104 expands from more fuel, magnets 108a are brought closer to sensors 108b and the voltage output by sensors 108b increases as the distance between the sensors and magnets 108a decreases. Conversely, fuel may be removed from bladder 104 such that the bladder collapses from one of the two expanded states represented in dashed lines in FIG. 3 to, e.g., the collapsed state represented in solid lines. As bladder 104 collapses due to fuel loss, magnets 108a are moved farther from sensors 108b and the voltage output by sensors 108b decreases as the distance between the sensors and magnets 108a increases.

In the example of fuel system 100 shown in FIG. 3, three Hall effect sensors 108 are distributed approximately equidistant from one another along the length of bladder chamber 102 and bladder 104. The lengths of bladder chamber 102 and bladder 104 in the example shown in FIG. 3 are determined along the y-axis direction. In other examples, however, fuel system 100 can include a greater or a fewer number of sensors to measure the deformation of bladder 104. For example, a greater or fewer number of Hall effect sensors 108 than that shown in FIG. 3 may be distributed approximately equidistant or in varying offsets along the lengths of bladder chamber 102 and bladder 104.

In another example, fuel system 100 can include multiple Hall effect sensors 108 distributed at substantially the same position along the length of bladder 104, but at different positions along a thickness of bladder 104, i.e. in a direction generally perpendicular to the plane of the view of FIG. 3 (along the z-axis direction). Additionally, other proximity sensors may be employed in addition to or in lieu of Hall effect sensors 108 to measure the deformation of bladder 104 within bladder chamber 102. For example, inductive, capacitive, or light proximity sensors may be employed to measure the deformation of bladder 104 within bladder chamber 102. In one particular example, one or more laser proximity sensors may measure deformation of an MAV bladder by sending a laser pulse in a narrow beam towards the bladder and measuring the time taken by the pulse to be reflected off the bladder and returned to the laser sensor.

As explained above, sensors 108b of fuel system 100 are configured to output voltage (or current or PWM signals) to respective amplifiers 110 that is based on the distance between the sensor and respective magnet(s) 108a. The voltage signal produced by sensors 108b is boosted by amplifiers 110 and transmitted to controller 114. Controller 114 receives the signals of sensors 108b and determines the amount of fuel in bladder 104 based on the magnitude of the voltage output by the sensors. For example, fuel system 100 can include a memory accessible by controller 114, where the memory stores one or more tables, databases or other data aggregation mechanisms and/or an algorithm for correlating voltage magnitude (e.g., amplitude) to fuel levels. In one example, controller 114 receives the voltage signals of sensors 108b and searches a table stored in the memory of fuel system 100 for these voltage magnitudes. Once controller 114 locates the voltage magnitudes indicated by the signals from sensors 108b in the table, the controller retrieves the fuel level associated with the voltage magnitudes in the table. In another example, controller 114 may be configured to execute an algorithm that analytically determines the amount of fuel in bladder 104 based on the magnitude of the voltage output by sensors 108b.

In some examples, controller 114 may analyze the signals from two or more sensors 108b to determine the amount of fuel in bladder 104. For example, controller 114 may average the voltage produced by sensors 108b and determine the amount of fuel in bladder 104 based on the average voltage output. In another example, controller 114 may first compare the voltage produced by each of sensors 108b to one another to determine if there are any significant deviations between the sensor voltages, e.g. if the voltages differ from one another by more than a threshold amount. In this example, controller 114 may average only two of the three voltages output by sensors 108b because the two voltages are relatively close in magnitude to one another compared to the third voltage, i.e. the two voltages used to calculate from one another differ by less than the threshold amount. In one example, controller 114 may determine that a sensor error of some kind has occurred because all three voltages of sensors 108b have widely divergent magnitudes.

In some examples, controller 114 may also account for the orientation of MAV 10, e.g., determined based on information from avionics and/or flight control modules in avionics pod 16 of the MAV, in the determination of the amount of fuel in bladder 104. For example, controller 114 may determine the orientation of MAV 10 with respect to the ground (or other landing surface) from avionics pod 16 and, based on the orientation data, select one or more particular Hall effect sensors 108 to use for measuring the amount of fuel in bladder 104. This discrimination between different sensors 108 may be necessary because the fuel in bladder 104 may be generally free to move around in bladder 104 during dynamic movement of MAV 10, which movement may cause local variations in the deformation of the bladder. In such instances, a signal generated by one of Hall effect sensors 108 may more accurately reflect the fuel in bladder 104 than signals generated by other Hall effect sensors 108.

In one example, controller 114 may execute an algorithm that determines the approximate location of the fuel (e.g., when bladder 104 is not full) within bladder 104 based on the orientation of MAV 10 with respect to the ground and the arrangement of bladder 104 within the MAV. After determining the part of bladder 104 in which the fuel is expected to have flowed in the current orientation of MAV 10, controller 114 may select one or more Hall effect sensors 108 in or nearest to that region to use for measuring the amount of fuel in bladder 104 based on the deformation of the bladder. Controller 114 may, for example, correlate each of the sensors 108 with a particular region of bladder 104. In the example of "C" shaped bladder 22 of MAV 10 of FIGS. 1 and 2, the portion of the bladder into which the fuel will flow may correspond to the segment of the "C" shaped bladder that is closest to the ground in any given orientation of MAV 10.

In addition to determining the amount of fuel in bladder 104 based on the magnitude of the voltage output by sensors 108b, controller 114 may control fuel gauge 112 to indicate the fuel level of the bladder. In the example of FIG. 3, fuel gauge 112 includes display 112a and legend 112b. In general, display 112a of fuel gauge 112 changes as a function of the amount of fuel in bladder 104 as determined by controller 114. In the example shown in FIG. 3, fuel gauge display 112a is a multi-segment display, some or all of which may be illuminated to indicate the amount (e.g., the volume) of fuel in bladder 104. For example, one or more light-emitting diodes (LEDs) may illuminate one or more segments of display 112a based on the amount of fuel in bladder 104. In particular, the number of the segments of display 112a illuminated by the LEDs may correlate to the amount of fuel in bladder 104 such that an increase in the amount of fuel in the bladder causes the LEDs to illuminate more of the segments and a decrease in the amount of fuel in the bladder causes the LEDs to illuminate fewer of the segments. Fuel gauge 112 also includes legend 112b, which correlates the number of segments of display 112a illuminated by the LEDs to a number of different amounts of fuel in bladder 104, including an empty, one half full, and full bladder.

Figure 4C:
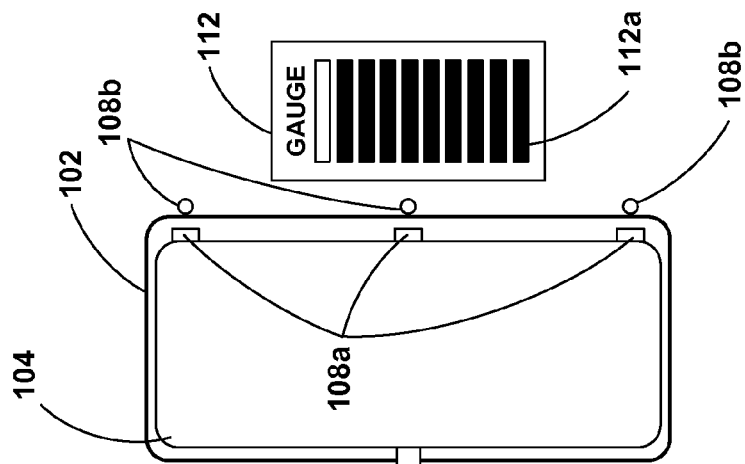
FIGS. 4A-4C are schematic illustrations of example displays provided by the fuel gauge of the fuel system of FIG. 3.
Figure 4B:
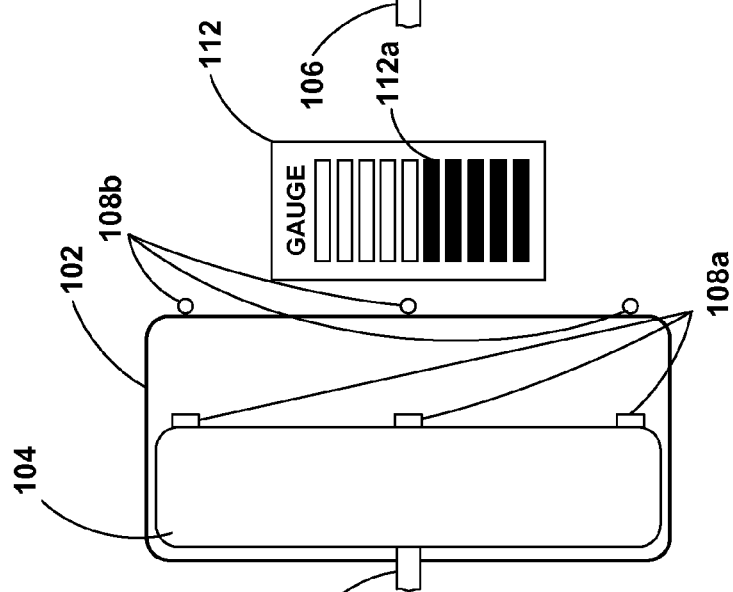
Figure 4A:
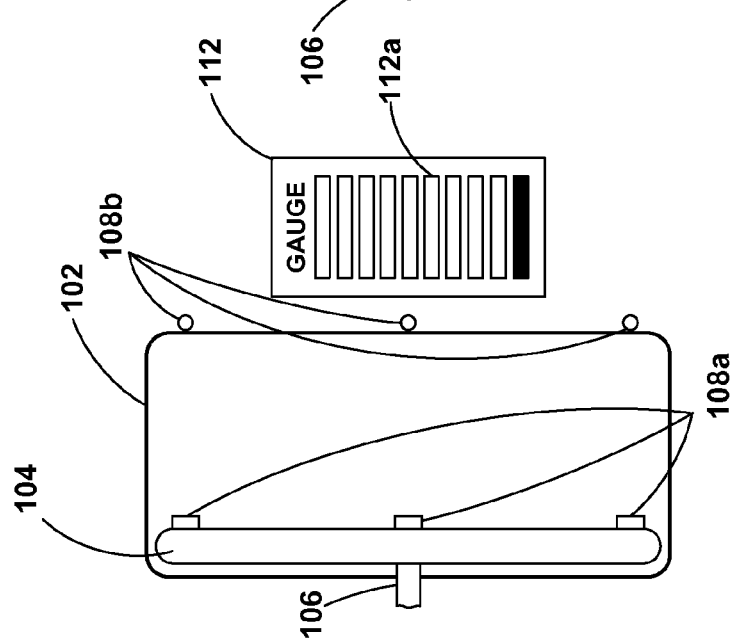

Different fuel levels can be indicated by fuel gauge 112, as illustrated in FIGS. 4A-4C, in which bladder 104 is successively filled with fuel such that the bladder expands causing magnets 108a to move closer to sensors 108b, which, in turn increases the voltage output of the sensors to cause controller 114 to display an increased fuel level on the fuel gauge. In FIG. 4A, bladder 104 is in a substantially collapsed state and display 112a of fuel gauge 112 reads near or at empty. In FIG. 4B, bladder 104 is in a partially expanded state and display 112a of fuel gauge 112 reads near or at half full. Finally, in FIG. 4C, bladder 104 is in a nearly fully expanded state and display 112a of fuel gauge 112 reads near full.

Although the examples of FIGS. 4A-4C illustrate fuel gauge 112 in the multi-segment LED configuration, other examples may include different fuel gauge displays. For example, an LED or liquid crystal display (LCD) may be employed as a fuel gauge by which fuel levels of bladder 104 may be indicated in a number of different alphanumeric or graphical representations. Additionally, fuel gauge 112 may include a somatosensory, audible and/or visual notification mechanism, e.g. a vibrating component, a blinking light or graphical display, and/or an audible sound issued by a speaker included in the fuel gauge. In such examples, fuel gauge 112 may be controlled by controller 114 to generate the somatosensory, audible and/or visual notification based on the amount of the fuel in bladder 104. For example, controller 114 may compare the amount of fuel in bladder 104 to a stored threshold value and control fuel gauge 112 to generate the notification if the amount of fuel is less than or equal to the threshold value. The threshold value can be predetermined (e.g., determined before a current flight mission of the MAV) by the operator of the MAV or by another entity.

In some examples, if controller 114 determines that the amount of fuel in bladder 104 is less than a predetermined threshold level, controller 114 can generate an indication (e.g., a signal, flag or a stored value) that indicates avionics 116 should not permit launch of MAV 10. In addition to or instead of generating an indication that helps prevent launch of MAV 10 when a relatively low amount of fuel is stored within bladder 104, controller 114 can directly control engine 14 to prevent the launch of MAV 10 when controller 114 determines that the amount of fuel in bladder 104 is less than a predetermined threshold level.

Referring again to FIG. 3, controller 114 may be implemented, at least in part, by hardware, software, firmware or any combination thereof. For example, various functions of controller 114 may be executed by or implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. Additionally, although fuel gauge 112, controller 114 and avionics 116 are schematically illustrated as separate components in fuel system 100, in other examples, the functions associated with one or more of these components may be logically and/or physically combined into one or more components. For example, fuel system controller 114 may be included in avionics 116, which function as the primary avionics system of the MAV in which the fuel system is included.

Fuel gauge 112 may include a display device mechanically connected to an MAV, e.g. MAV 10, to actively indicate the level of fuel in bladder 104 for inspection by operators. Controller 114 can update fuel gauge 112 to provide a real-time indication of the amount of fuel within bladder 104. In other examples, controller 114 updates fuel gauge 112 to indicate the amount of fuel within bladder 104 at periodic intervals (e.g., intervals in range of about one second to about every two minutes). In addition to or in lieu of a local display device carried by the MAV, fuel gauge 112 may include a physically separate device in communication with controller 114 and/or sensors 108. For example, fuel system controller 114 may be included in avionics 116 and fuel gauge 112 may be part of a handheld device in communication with controller 114 to indicate the level of fuel in bladder 104 for inspection by operators as needed (e.g., during flight of MAV 10). The physically separate device can be remotely located from controller 114. For example, controller 114 may be located onboard MAV 10, and the separate device can be with a remotely located operator.

Communication between controller 114 and a handheld device including fuel gauge 112 may be accomplished via a variety of telemetry techniques. For example, controller 114 and a handheld fuel gauge may communicate via radio antenna 34 (FIG. 1) of MAV 10. In some examples, if the communication link between controller 114 and the remote handheld device (or another device that receives the signal from controller 114) is lost, controller 114 may control avionics to initiate an emergency landing. The emergency landing may help prevent a collision of the MAV due to an insufficient amount of fuel.

In another example, controller 114, fuel gauge 112, and at least one sensor 108b may be incorporated into a handheld device that may be employed by an operator to determine and display the level of fuel in bladder 104 for inspection by operators. In such examples, an operator may use the handheld device by bringing the device, and sensor 108b included therein, in proximity to one or more of magnets 108a. Sensor 108b, upon being brought within a certain range of one of magnets 108a or upon application of a voltage by controller 114 will output a voltage, the magnitude of which may be used by controller 114 to determine and display on fuel gauge 112 the amount of fuel in bladder 104. Such handheld or other portable devices may provide several advantages, including, e.g. reducing the weight of MAV 10 by removing the necessity for additional fuel gauge control electronics or sensors that are on the vehicle, reducing any modifications to MAV 10 required to incorporate fuel system 100 into MAV, providing operators with on demand fuel indications, and reducing costs by employing one handheld device for use with multiple MAVs.

In another example, fuel gauge 112 includes a component remote from the MAV in which fuel system 100 is included. For example, fuel gauge 112 may be implemented as a software application executed by a device remote from the MAV and in wireless communication with controller 114, e.g. via radio antenna 34 of MAV 10 of FIG. 1. The device executing the software based fuel gauge 112 may be, e.g. a computer employed by an operator of the MAV that maneuvers the unmanned vehicle during missions and/or testing. In another example, fuel gauge 112 may be implemented in a handheld device or component of larger military platform, e.g. vehicle or weapons platform, that is remote from and in communication with the MAV and, in particular, controller 114 of fuel system 100.

In the foregoing examples a single controller 114 has been described as executing the functions associated with determining the amount of fuel in bladder 104 based on voltage output by sensors 108b. However, in other examples, the various functions attributed to controller 114 may be divided among multiple devices at one or more locations. In one example, a first controller may be included on MAV 10 to receive voltage signals from sensors 108b and transmit these signals to a remote fuel gauge device. The remote fuel gauge device may include electronics for determining the amount of fuel in bladder 104 based on the voltage signals received and transmitted by the first controller onboard MAV 10, as well as for displaying an indication of the determined fuel level.

The foregoing examples including fuel systems configured to determine an amount of fuel in a fuel bladder of an UAV based on the deformation of the fuel bladder may be advantageously retrofitted to existing vehicles. For example, fuel system 100 may be relatively simply and inexpensively retrofitted to MAV 10 without any significant modifications to bladder chamber 102 of the vehicle duct or bladder 104. Additionally, because, in some examples, only magnets 108a are arranged within bladder chamber 102, the magnets may be adhered to an existing chamber construction without routing power or any other connections into the chamber. That is, in the example fuel system 100 shown in FIG. 3, the components of fuel system 100 that are included within bladder chamber 102 are passive components that do not require power to operator.

Figure 5:
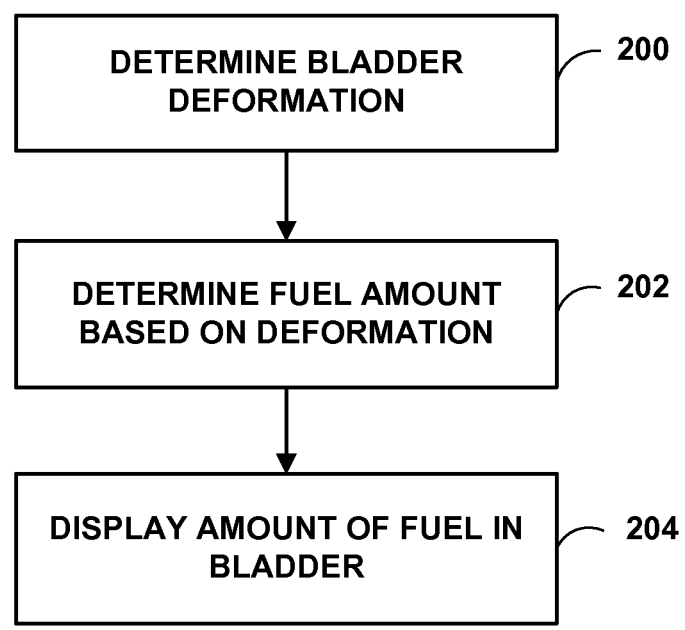
FIG. 5 is a flow chart illustrating an example method of determining the amount of fuel in the bladder of an MAV.

FIG. 5 is a flow chart illustrating an example method of determining the amount of fuel in the bladder of an MAV. In the method of FIG. 5, a proximity sensor determines deformation of a MAV bladder as fuel is added to and removed from the bladder (200). A controller determines the amount of fuel in the bladder based on the deformation measured by the proximity sensor (202). A fuel gauge displays the determined amount of fuel in the bladder (204).

The functions of the method of FIG. 5 for determining the amount of fuel in the bladder of an MAV are described as carried out by various components of example fuel system 100 of FIGS. 3 and 4A-4C. However, in other examples, one or more of the functions of the method of FIG. 5 may be carried out by other devices or systems that differ from fuel system 100 in constitution and arrangement. For example, instead of employing Hall effect sensors 108 as in example fuel system 100, deformation of the MAV fuel bladder may be measured by at least one of inductive, capacitive, or light proximity sensors.

The method of FIG. 5 includes determining deformation of a MAV bladder with a proximity sensor as fuel is added to and removed from the bladder (200). In one example, during operation of an MAV including fuel system 100 shown in FIG. 3, fuel will, at various times, be added to and removed from bladder 104. As the amount of fuel in bladder 104 changes, the bladder will deform, e.g. expand and collapse within bladder chamber 102. Proximity sensors are employed to measure the deformation of bladder 104 as the amount of fuel in the bladder changes. In the example fuel system 100 shown in FIG. 3, sensors 108b are configured to output voltage that is based on the distance between the sensor 108b and respective magnet 108a. The voltage output by sensors 108b changes based on the expansion and collapse of bladder 104, because such deformation of the bladder changes the distance between the sensors and magnets 108a. As noted above, sensors 108b may, in some examples, be configured to output current or PWM signals as a function of the distance between each respective sensor 108b and corresponding magnet 108a. Thus, the techniques described herein for determining an amount of fuel in the bladder of a MAV or another air vehicle based on the voltage output by one or more sensors 108b may also be used to determine the amount of fuel in the bladder of a MAV or another air vehicle based on the current signal and/or PWM signal output by one or more sensors 108b.

The method of FIG. 5 also includes determining the amount of fuel in the MAV bladder based on the deformation determined by the proximity sensor (202). In one example, controller 114 of fuel system 100 receives signals of sensors 108b and determines the amount of fuel in bladder 104 based on the magnitude of the voltage output by the sensors. For example, increases in the amplitude of a voltage signal output by sensors 108b may correspond to magnets 108a being moved closer to the sensors as added fuel expands bladder 104. As described above, controller 114 may include one or more tables, databases or other data aggregation mechanisms and/or an algorithm for correlating voltage magnitudes indicated by sensors 108b to fuel levels. Controller 114 may also analyze the signals from the three sensors 108b to determine the amount of fuel in bladder 104. For example, controller 114 may average the voltage produced by sensors 108b and determine the amount of fuel in bladder 104 based on the average voltage output.

In addition to determining the amount of fuel in the MAV bladder based on the deformation determined by the proximity sensor (202), the method of FIG. 5 includes displaying the determined amount of fuel in the bladder with a fuel gauge (204). In one example, controller 114 of fuel system 100 may control fuel gauge 112 to display the fuel level of bladder 104. The function of fuel gauge 112 of fuel system 100 is illustrated in FIGS. 4A-4C, in which bladder 104 is successively filled with fuel such that the bladder expands causing magnets 108a to move closer to sensors 108b, which, in turn increases the voltage output of the sensors to cause controller 114 to display an increased fuel level on the fuel gauge. In FIG. 4A, bladder 104 is in a substantially collapsed state and display 112a of fuel gauge 112 reads near or at empty. In FIG. 4B, bladder 104 is in a partially expanded state and display 112a of fuel gauge 112 reads near or at half full. Finally, in FIG. 4C, bladder 104 is in a nearly fully expanded state and display 112a of fuel gauge 112 reads near full. As noted above, in some examples, fuel gauge 112 may include a somatosensory, audible and/or visual notification mechanism, e.g. a blinking light or graphical display and/or an audible sound, which, may be triggered by controller 114, e.g., in the event the amount of fuel in bladder 104 is determined to be below a threshold value stored in a memory of controller 114 or another device communicatively connected to the controller.

Functions executed by avionics or other electronics associated with MAV 10 may be implemented, at least in part, by hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in an avionics system of MAV 10. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to MAV 10 avionics may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure.

Any of the described units, modules or components may be implemented together or separately as discrete but interoperable logic devices. Depiction of different features as modules or units is intended to highlight different functions and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed to support one or more aspects of the functionality described in this disclosure.

Various examples have been described. These and other examples are within the scope of the following claims.

The invention claimed is:

1. A fuel system for an unmanned aerial vehicle (UAV), the fuel system comprising:
   a deformable bladder configured to store fuel;
   a plurality of proximity sensors, each proximity sensor being configured to output a signal based on deformation of the bladder;
   a fuel gauge;
   an avionics pod configured to generate orientation data; and
   a controller configured to select one or more proximity sensors of the plurality of proximity sensors based on the orientation data, determine an amount of the fuel in the bladder based on the signals output by the one or more selected proximity sensors, and control the fuel gauge to indicate the amount of the fuel.

2. The system of claim 1, wherein the plurality of proximity sensors comprises at least one Hall effect sensor configured to output at least one of a voltage, a current, or a pulse width modulated signal based on the deformation of the bladder.

3. The system of claim 2, wherein the at least one Hall effect sensor comprises:
   a magnet mechanically connected to the bladder; and
   a sensor that outputs a voltage that varies as a function of a distance between the magnet and the sensor.

4. The system of claim 3 further comprising a handheld device comprising the sensor.

5. The system of claim 3, wherein the at least one Hall effect sensor comprises a plurality of Hall effect sensors each of which comprises a magnet mechanically connected to the bladder and a sensor adjacent the magnet, wherein the sensor outputs the voltage as a function of the distance between the magnet and the sensor.

6. The system of claim 5, wherein the controller is configured to determine an average voltage of a plurality of voltages produced by the Hall effect sensors and determine the amount of the fuel in the bladder based on the average voltage.

7. The system of claim 5, wherein the controller is configured to:
   determine an average voltage of a plurality of voltages produced by the Hall effect sensors that differ from one another by less than a threshold; and
   determine the amount of the fuel in the bladder based on the average voltage.

8. The system of claim 1, wherein the fuel gauge comprises a display that visually indicates the amount of the fuel in the bladder determined by the controller.

9. The system of claim 1, wherein the plurality of proximity sensors comprises at least one of an inductive sensor, a capacitive sensor, or a light sensor.

10. The system of claim 1, wherein the fuel gauge comprises at least one of a somatosensory notification, a audible notification or a visual notification, wherein the controller controls the fuel gauge to generate the at least one of the somatosensory, audible or visual notification based on the amount of the fuel in the bladder.

11. The system of claim 10, wherein the controller compares the amount of the fuel to a threshold value and controls the fuel gauge to generate the at least one of the somatosensory, audible or visual notification if the amount of the fuel is below the threshold value.

12. An unmanned aerial vehicle comprising:
   an avionics pod configured to generate orientation data;
   a fan duct that defines a chamber;
   a bladder that is arranged within the chamber, wherein the bladder deforms based on an amount of fuel in the bladder;
   a plurality of proximity sensors, each proximity sensor of the plurality of proximity sensors being configured to output a signal indicative of a deformation of the bladder;
   a fuel gauge; and
   a controller configured to select one or more proximity sensors of the plurality of proximity sensors based on the orientation data and to determine the amount of fuel in the bladder based on the signals output by the selected proximity sensors and control the fuel gauge to indicate the determined amount of fuel.

13. The unmanned aerial vehicle of claim 12, wherein the plurality of proximity sensors comprises:
   a magnet mechanically connected to the bladder; and
   a sensor that outputs at least one of a voltage, a current, or a pulse width modulated signal that varies as a function of a distance between the magnet and the sensor.

14. A method comprising:
   determining a deformation of a bladder of an unmanned aerial vehicle with at least one proximity sensor, wherein determining the deformation of the bladder comprises:
      receiving orientation data indicative of an orientation of the unmanned aerial vehicle;
      selecting one or more proximity sensors of a plurality of proximity sensors based on the orientation data; and
      determining the deformation of the bladder based on signals generated by the selected one or more proximity sensors of the plurality of proximity sensors;
   determining an amount of fuel in the bladder based on the deformation; and
   indicating, via a fuel gauge, the amount of fuel in the bladder.

15. The method of claim 14, wherein determining the deformation of the bladder comprises determining the deformation of the bladder with a plurality of Hall effect sensors each of which comprises a magnet mechanically connected to the bladder and a sensor adjacent the magnet, wherein the sensor outputs at least one of a voltage, a current, or a pulse width modulated signal as a function of a distance between the magnet and the sensor.

16. The method of claim 15, further comprising determining an average voltage of a plurality of voltages output by the Hall effect sensors, wherein determining the amount of fuel in the bladder comprises determining the amount of fuel in the bladder based on the average voltage.

17. The system of claim 1, wherein the controller is configured to determine an orientation of the UAV relative to a ground based on the orientation data and to select the one or more proximity sensors based on the orientation of the UAV relative to the ground.

18. The system of claim 12, wherein the controller is configured to determine an orientation of the UAV relative to a ground based on the orientation data and to select the one or more proximity sensors based on the orientation of the UAV relative to the ground.

* * * * *